United States Patent
Eberlein

(10) Patent No.: US 11,451,537 B2
(45) Date of Patent: Sep. 20, 2022

(54) SECURING IDENTITY TOKEN FORWARDING

(71) Applicant: SAP SE, Walldorf (DE)

(72) Inventor: Peter Eberlein, Malsch (DE)

(73) Assignee: SAP SE, Walldorf (DE)

(*) Notice: Subject to any disclaimer, the term of this patent is extended or adjusted under 35 U.S.C. 154(b) by 140 days.

(21) Appl. No.: 16/848,961

(22) Filed: Apr. 15, 2020

(65) Prior Publication Data
US 2021/0328980 A1    Oct. 21, 2021

(51) Int. Cl.
*H04L 29/06* (2006.01)
*H04L 9/40* (2022.01)

(52) U.S. Cl.
CPC ...... *H04L 63/0853* (2013.01); *H04L 63/0823* (2013.01)

(58) Field of Classification Search
CPC ................ H04L 63/0853; H04L 63/0823
See application file for complete search history.

(56) References Cited

U.S. PATENT DOCUMENTS

| | | | |
|---|---|---|---|
| 9,231,942 B1* | 1/2016 | Pinkerton | H04L 63/107 |
| 9,819,665 B1* | 11/2017 | Machani | H04L 9/3234 |
| 10,025,941 B1* | 7/2018 | Griffin | G06F 21/6209 |
| 2011/0307947 A1* | 12/2011 | Kariv | H04L 63/08 726/9 |
| 2013/0268687 A1* | 10/2013 | Schrecker | H04W 12/06 709/229 |
| 2014/0173695 A1* | 6/2014 | Valdivia | G06F 21/33 726/4 |
| 2014/0331309 A1* | 11/2014 | Spiers | H04L 63/0281 726/12 |
| 2016/0380997 A1* | 12/2016 | Blasi | H04L 63/0876 726/9 |
| 2018/0234411 A1* | 8/2018 | Masiero | H04L 63/0853 |
| 2018/0367321 A1* | 12/2018 | Stammers | H04W 4/24 |
| 2019/0372962 A1* | 12/2019 | Maria | G06F 21/41 |
| 2020/0127994 A1* | 4/2020 | Kukreja | G06F 21/31 |
| 2020/0195439 A1* | 6/2020 | Suresh | H04L 67/08 |
| 2020/0236105 A1* | 7/2020 | Doshi | H04L 63/0884 |
| 2020/0259652 A1* | 8/2020 | Schmaltz, III | H04L 9/3247 |

(Continued)

OTHER PUBLICATIONS

Nitin Naik et al., Securing Digital Identities in the Cloud by Selecting an Apposite Federated Identity Management from SAML, OAuth and OpenID Connect, Jun. 26, 2017, IEEE, pp. 1-12. (Year: 2017).*

(Continued)

*Primary Examiner* — Jeffrey C Pwu
*Assistant Examiner* — Fahimeh Mohammadi
(74) *Attorney, Agent, or Firm* — Fish & Richardson P.C.

(57) ABSTRACT

Methods, systems, and computer-readable storage media for receiving, from a first component and by a second component in a cloud platform, a call, a token, and a first client certificate, determining, by the second component, a first client identifier associated with the first component, and determining, by the second component, that the first client identifier is included in a manifest of the token, the manifest defining at least a portion of a communication path between components within the cloud platform, and in response: executing functionality responsive to the call.

11 Claims, 10 Drawing Sheets

(56) References Cited

U.S. PATENT DOCUMENTS

2020/0403986 A1* 12/2020 Gosalia .................. G06F 21/41
2021/0184864 A1* 6/2021 Wentz .................. H04L 9/3247

OTHER PUBLICATIONS

Azeem Ahmad et al., A Multi-Token Authorization Strategy for Secure Mobile Cloud Computing, Jun. 16, 2014, IEEE, pp. 136-141. (Year: 2014).*

Hsiao-Ying Lin et al., A Secure Erasure Code-Based Cloud Storage System with Secure Data Forwarding, Jun. 2012, IEEE, vol. 23, Issue: 6, pp. 995-1003. (Year: 2012).*

Yan Yang et al., An Identity and Access Management Architecture in Cloud, Apr. 9, 2015, IEEE, pp. 200-203. (Year: 2015).*

* cited by examiner

SECURING IDENTITY TOKEN FORWARDING

BACKGROUND

Cloud computing can be described as Internet-based computing that provides shared computer processing resources, and data to computers and other devices on demand. Users can establish respective sessions, during which processing resources, and bandwidth are consumed. During a session, for example, a user is provided on-demand access to a shared pool of configurable computing resources (e.g., computer networks, servers, storage, applications, and services). The computing resources can be provisioned and released (e.g., scaled) to meet user demand.

A common architecture in cloud platforms includes microservices (also referred to as services), which have gained popularity in service-oriented architectures (SOAs). In the microservice architecture, applications are composed of multiple, independent services, and are deployed in standalone containers with a well-defined interfaces. The services are deployed and managed by a cloud platform, and run on top of a cloud infrastructure. In microservice architectures the primary attention is on communication between services, especially on secure communication.

Security here has several aspects, one aspect including authentication. There are multiple dimensions to authentication. Examples dimensions include authenticating components calling a service (e.g., a service another service, an application calling a service), and authenticating a user on whose behalf the call is made. In some instances, both dimensions are addressed in a single token (e.g., such as an open authentication (OAuth) access token), which authenticates both the calling component and the user. In such instances, a different token is needed for each communication leg in a chain of service calls, because the calling component changes with each call. This requires a token exchange, which is often recognized as overhead and undesired complexity. However, this has been a traditional approach in an effort to avoid compromising security. While alternative security approaches have been introduced, such approaches introduce their own security issues.

SUMMARY

Implementations of the present disclosure are directed to secure token forwarding that addresses security challenges in microservice architectures. More particularly, implementations of the present disclosure restrict arbitrary forwarding of tokens using a manifest of allowed communication routes and enabling each service to determine whether a caller is allowed to call the service.

In some implementations, actions include receiving, from a first component and by a second component in a cloud platform, a first call, a token, and a first client certificate, determining, by the second component, a first client identifier associated with the first component, and determining, by the second component, that the first client identifier is included in a manifest of the token, the manifest defining at least a portion of a communication path between components within the cloud platform, and in response: executing functionality responsive to the first call. Other implementations of this aspect include corresponding systems, apparatus, and computer programs, configured to perform the actions of the methods, encoded on computer storage devices.

These and other implementations can each optionally include one or more of the following features: executing functionality responsive to the first call at least partially includes transmitting, from the second component and to a third component, a second call with the token; the token is received by the first component from a third component; actions further include receiving, from a third component and by the second component, a second call, the token, and a second client certificate, determining, by the second component, a second client identifier associated with the third component, and determining, by the second component, that the second client identifier is absent from the manifest of the token, and in response: transmitting an error to the third component; the token provided to the first component in response to a request from the first component to a central identity and authentication service (IAS) of the cloud platform, the request including the first client certificate; the first client certificate is provided during execution of a process to generate the token; the token includes an open authentication (OAuth) client having an audience field populated with the manifest; and the first client certificate includes a X.509 client certificate.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
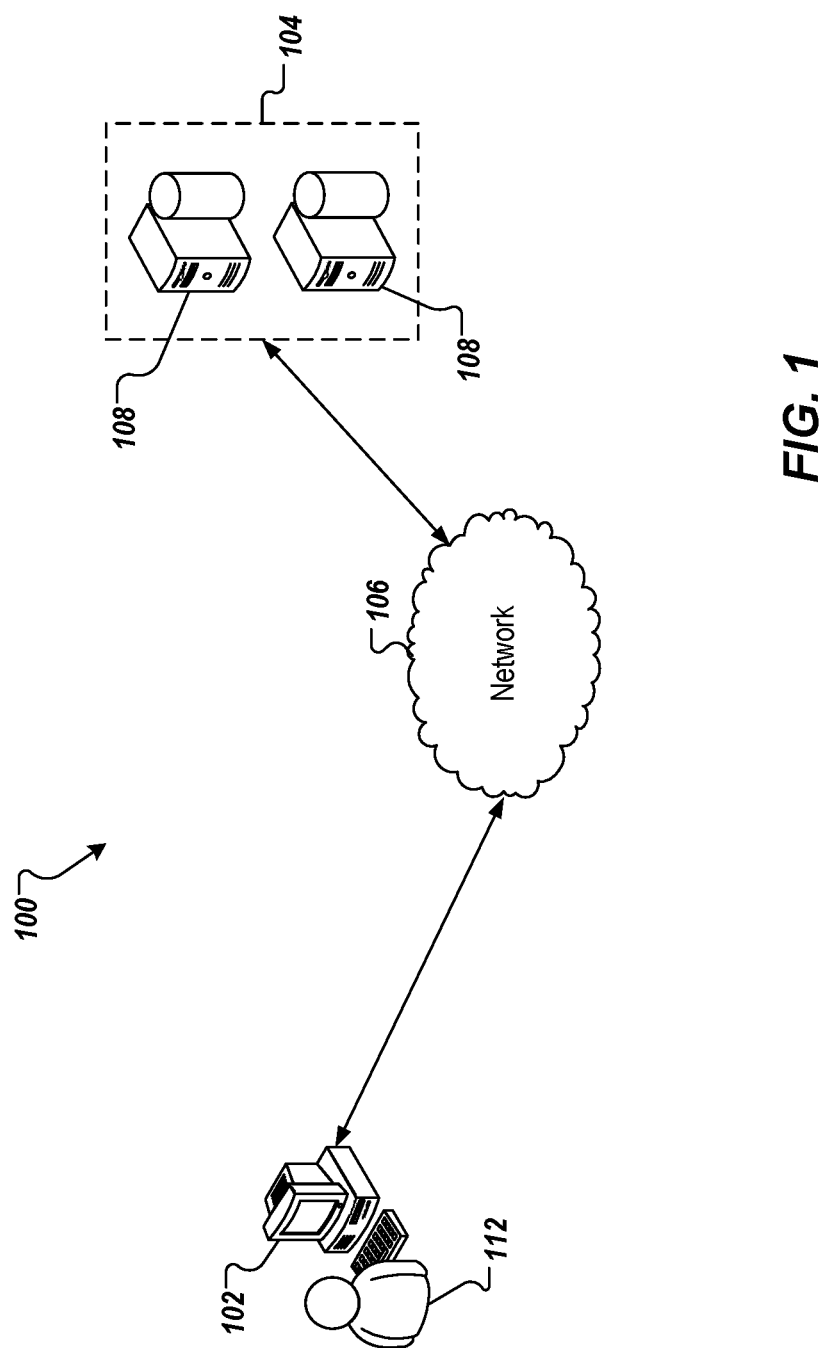
FIG. 1 depicts an example architecture that can be used to execute implementations of the present disclosure.

Implementations of the present disclosure are directed to secure token forwarding that addresses security challenges in microservice architectures. More particularly, implementations of the present disclosure restrict arbitrary forwarding of tokens using a manifest of allowed communication routes and enabling each service to determine whether a caller is allowed to call the service. Implementations can include actions of receiving, from a first component and by a second component in a cloud platform, a call, a token, and a first client certificate, determining, by the second component, a first client identifier associated with the first component, and determining, by the second component, that the first client identifier is included in a manifest of the token, the manifest defining at least a portion of a communication path between components within the cloud platform, and in response: executing functionality responsive to the call.

To provide further context for implementations of the present disclosure, and as introduced above, cloud computing can be described as Internet-based computing that provides shared computer processing resources, and data to computers and other devices on demand. Users can establish respective sessions, during which processing resources, and bandwidth are consumed. During a session, for example, a user is provided on-demand access to a shared pool of configurable computing resources (e.g., computer networks, servers, storage, applications, and services). The computing resources can be provisioned and released (e.g., scaled) to meet user demand.

A common architecture in cloud platforms includes microservices (also referred to as services), which have gained popularity in service-oriented architectures (SOAs). In the microservice architecture, applications are composed of multiple, independent services, and are deployed in standalone containers with a well-defined interfaces. The services are deployed and managed by a cloud platform, and run on top of a cloud infrastructure.

As also introduced above, in microservice architectures the primary attention is on communication between services, especially on secure communication. Security here has several aspects, one aspect including authentication. There are multiple dimensions to authentication. Examples dimensions include authenticating components calling a service (e.g., a service another service, an application calling a service), and authenticating a user on whose behalf the call is made. In some instances, both dimensions are addressed in a single token (e.g., such as an open authentication (OAuth) access token), which authenticates both the calling component and the user. In such instances, a different token is needed for each communication leg in a chain of service calls, because the calling component changes with each call. This requires a token exchange, which is often recognized as overhead and undesired complexity. However, this has been a traditional approach in an effort to avoid compromising security.

As an alternative, the multiple authentication dimensions can be addressed with respective orthogonal security means. For example, if the calling component is authenticated using client certificates (e.g., X.509 client certificates used by SSL/TLS) and the token only identifies the user (e.g., OpenID Connect (OIDC) tokens), then one originally issued token can be forwarded and can be combined with each component's private client certificate. While this approach successfully avoids the need for exchanging tokens, it creates new security challenges. A first security challenge includes how to restrict which components are allowed to forward an identity token along a defined communication route to specific services. A second security challenge includes how to enforce these restrictions in order to prevent malicious components from impersonating users at services that the malicious components should not get access to.

As an example of these threats, an attacker could deploy two applications to a cloud platform marketplace. A first application can be apparently innocuous, as it does not request access to any services containing sensitive data. A second application can legitimately require access to a master data service that, for example, contains all of the employee data for a company (a so-called critical service). In this example, only the second application gets a client certificate that allows the second service to call the master data service, while the first application is not able to obtain its own client certificate. If a company subscribes to the first application and a user of the company logs on, the first application should not be able to use the identity token of the user to access the master data service. However, unless restricted otherwise, the first application could pass the identity token illicitly to the second application that does have a valid client certificate for accessing the master data service. Although the company did not subscribe to this second application, the second application could still use its client certificate to call the master data service with the identity token illicitly received from the first application and access data on behalf of the user that logged into the first application.

In an environment like a cloud platform where development partners, consultant companies, and even individual developers can offer applications in an open marketplace, attacks that are based on illicit token forwarding must be prevented by the cloud platform. More particularly, applications may only access data (e.g., customer data, employee data) as declared, so customers can judge which access they grant to which third party applications and rely on these restrictions to be enforced.

In view of the above context, implementations of the present disclosure provide secure token forwarding that addresses security challenges, such as the security challenges described herein. More particularly, implementations of the present disclosure restrict arbitrary forwarding of tokens using a manifest of allowed communication routes. In some implementations, the manifest is recorded in a field of an identity token (e.g., the audience (aud) field of an OIDC token). In some implementations, services are able to authenticate their callers and can verify that the caller is allowed to call the service according to the manifest.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, the server system 104 can represent a cloud platform that hosts microservices (also referred to herein as services). For example, the server system 104 can host a service-based architecture that can process calls from an application based on the secure identity token forwarding of the present disclosure, described in further detail herein.

As introduced above, implementations of the present disclosure prevent arbitrary forwarding of tokens based on a manifest included with identity tokens (e.g., OIDC token), the manifest defining an allowed communication route for forwarding of the identity token. In some examples, the manifest is provided in a field of the identity token (e.g., and of an OIDC token). Further, a service receiving a call is able to authenticate the caller and verify that the caller is allowed to call the service according to the manifest.

In further detail, components that request access to call services declare these services as dependencies in a central identity and authentication service (IAS). The IAS can aggregate this information across all component-to-service relations to construct the complete communication routes from an application to all services used directly or indirectly by the application. Each service provides a client certificate to their calling components that uniquely identify individual legs of communication routes. More particularly, a client certificate uniquely identifies the component that sends the client certificate with a call. There may be different routes sharing common legs, so a component can always its same client certificate when calling a service along any route. This is true no matter in which context the call is made (i.e., from which application the call chain originated).

The client certificate can be used by a receiving component to authenticate the sending component using a public key infrastructure (PKI). An example client certificate includes the X.509 client certificate, which uses the X.509 PKI standard to verify that a public key belongs to a component. Authentication of the sending component by the receiving component is a known process using the PKI. Consequently, a detailed description of the authentication is foregone.

In accordance with implementations of the present disclosure, the IAS issues and signs identity tokens that include a manifest of allowed legs of the communication routes. When forwarded, called services verify that the direct caller (e.g., user, service) is authorized to act on behalf of the user stated in the identity token by cross-checking that the client certificate of the caller identifies a leg of the communication route listed in the manifest of the identity token.

In this manner, applications can request identity tokens that capture allowed communication routes. These identity tokens can only be forwarded to services along these routes, and no component can skip intermediate services, call back to components it was called from or pass the identity token to another component to use the identity token along communication routes outside of that defined in the identity token.

Figure 2:
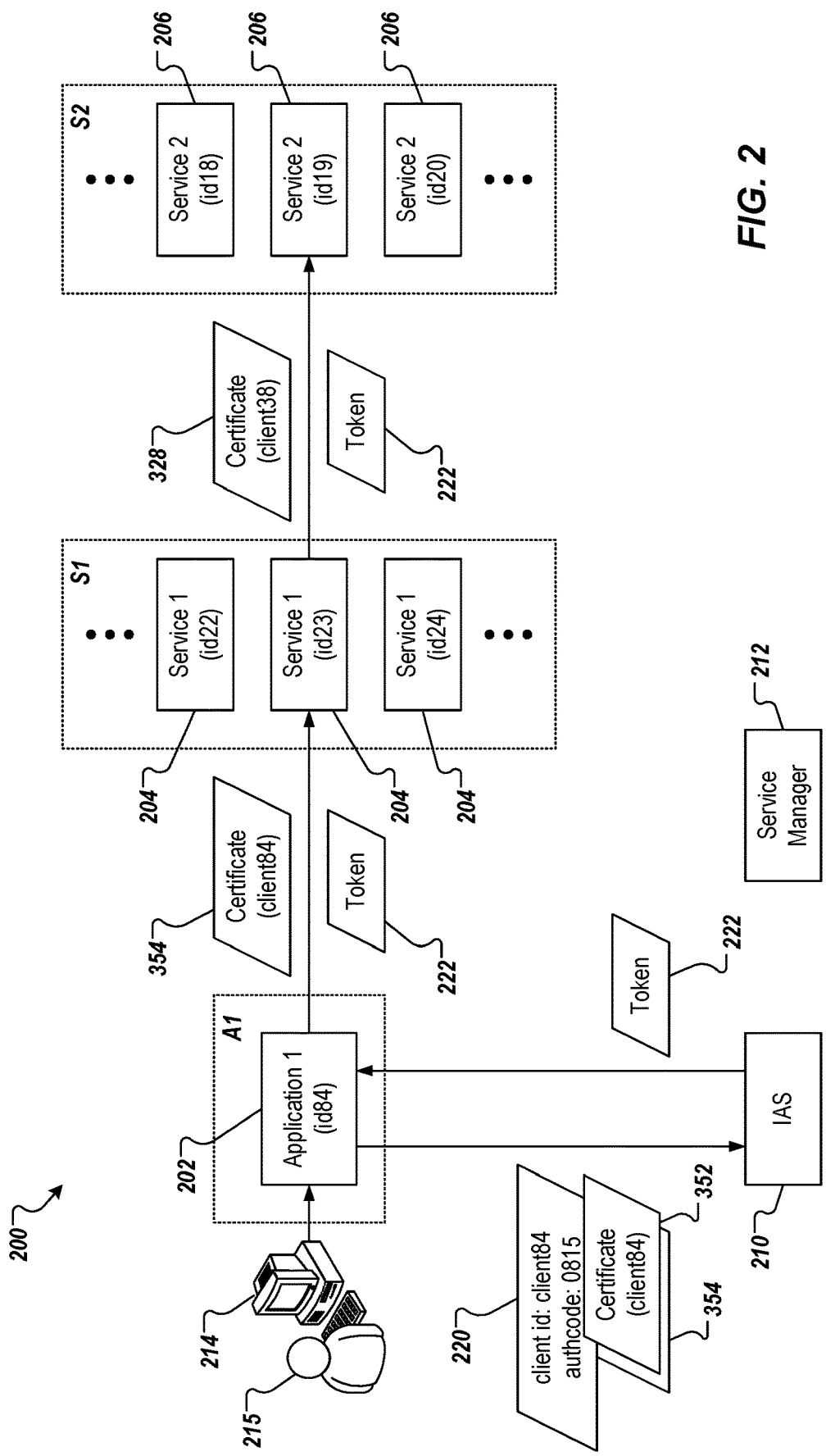
FIG. 2 depicts a conceptual architecture for secure identity token forwarding in accordance with implementations of the present disclosure.

FIG. 2 depicts a conceptual architecture 200 for secure identity token forwarding in accordance with implementations of the present disclosure. The example conceptual architecture 200 includes an application 202 in an application sub-account A1, service instances 204 of a first service within a first service sub-account S1, service instances 206 of a second service within a second service sub-account S2, an IAS 210, a service manager 212, and a client 214. The example of FIG. 2 depicts an allowed communication route that is constructed in accordance with implementations of the present disclosure, as described in further detail herein with reference to FIGS. 3A-3E.

FIGS. 3A-3E depict an example progression for constructing a secure communication route using identity token forwarding in accordance with implementations of the present disclosure. Construction of communication routes is performed in a decentralized manner, where each component (e.g., client, application, service) only declares its own immediate dependencies in its local terminology. The IAS constructs the complete picture in terms of unique identifiers that are embedded in client certificates that allow simple and secure validation of allowed legs of communication routes. The example progression of FIGS. 3A-3E is a representative example for constructing a communication route with the application 202 of FIG. 2 calling a service instance 204 of the first service, and the service instance 204 calling a service instance 206 of the second service. In some implementations, definition of the allowed communication route occurs during design-time of the services, as described in further detail herein.

In constructing a communication route, the service manager (SM) 212 manages service instances that represent components in communication routes. These instances can be used to declare dependencies among components to the IAS 210, which enables the IAS 210 to construct the manifest of allowed communication routes. In FIGS. 3A-3E, the persistencies of the IAS 210 and the service manager 212 are provided as an IAS data store 300 and a SM data store 302, respectively.

As described in further detail herein, getting or provisioning of a "service instance" of a service (e.g., such as the IAS) means, that the consumer of the service (e.g., the developer of the second service in the case of FIG. 2) is provided its own personal instance of the service. For example, if a first developer is provisioned with an IAS service instance and a second developer is provisioned with an IAS service instance, both the first developer and the second developer have respective IAS service instances that each can use, but the service instances are completely separate. To implement this, the service could for example start an individual Java service for each developer and associate that with the corresponding service instance. In the case of IAS, creating an instance means that an identifier (ID) is created and all further entities that the IAS handles are associated with the corresponding ID. In this manner, individual service instances are isolated from each other.

In further detail, and with continued reference to FIG. 2, when the developer creates the service instance 206, which is an instance of the IAS service, the instance has a name (IAS4S2) in a certain namespace (S2) that was assigned an ID (id19). Further entities, like the OAuth client and the X.509 certificate that are created, are recorded under this id19 in the persistence of IAS, as described herein. Consequently, only the owner of the IAS4S2 service instance (e.g., the developer of the second service) can access these entities. However, in the context of declaring dependencies, these names can also be used to reference the associated IDs (ids), providing unique identifiers that can be referenced by names defined by developers within their namespace.

Figure 3A:
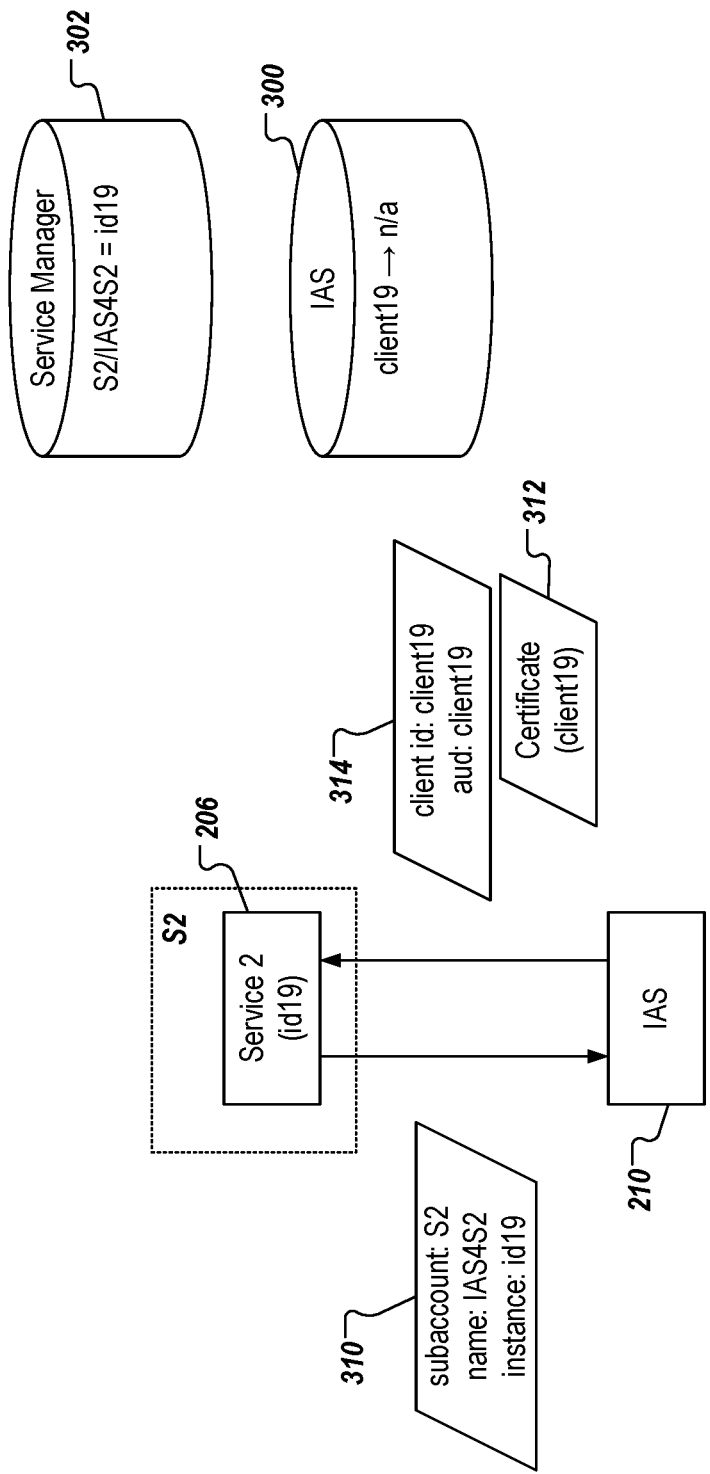
FIGS. 3A-3E depict an example progression for constructing secure communication routes in accordance with implementations of the present disclosure.

With particular reference to FIG. 3A, a developer of the second service creates a service instance 206 of IAS 210 that is assigned an instance identifier of id19 (e.g., by the SM 212), which uniquely identifies the service instance 206 within the sub-account S2. The developer of the second service assigns the name IAS4S2 to the service instance 206 of IAS. More particularly, a request 310 is transmitted to the IAS 210 (e.g., from the developer), the request 310 including parameters of sub-account, name, and instance identifier (e.g., [S2, IAS4S2, id19]). The service manager 212 stores the relation for later lookup of the identifier by name and context (e.g., S2/IAS4S2=id19).

The IAS 210 associates the identifier id19 to a client with the identifier client19. The client enables a component in possession of the client to fetch a token to get access to associated resources without demonstrating possession of the client itself. An example token includes the OIDC identity token (that can be used as an OAuth bearer token). It is contemplated, however, that implementations of the present disclosure can be realized with any appropriate token. The IAS 210 returns a client certificate 312 (e.g., X.509 certificate) and a client 314 to the service instance 206. The client certificate 312 includes the identifier client19. The client 314 includes the identifier populated with client19 and an audience field (aud) populated with the identifier client19. Because this is the first service created, the IAS 210 has no route to store from client19 to any other client. Consequently, the IAS 210 stores the reference client19 →n/a.

With the setup established as depicted in FIG. 3A, the client 314 can be subsequently used to get a token from the IAS 210 that includes client19 in aud. With this token and the client certificate 312 (with identifier client19), the service 206 of FIGS. 3A-3E can be called and can verify that the call is valid, because the identifier from the client certificate is in the aud of the token.

Figure 3B:
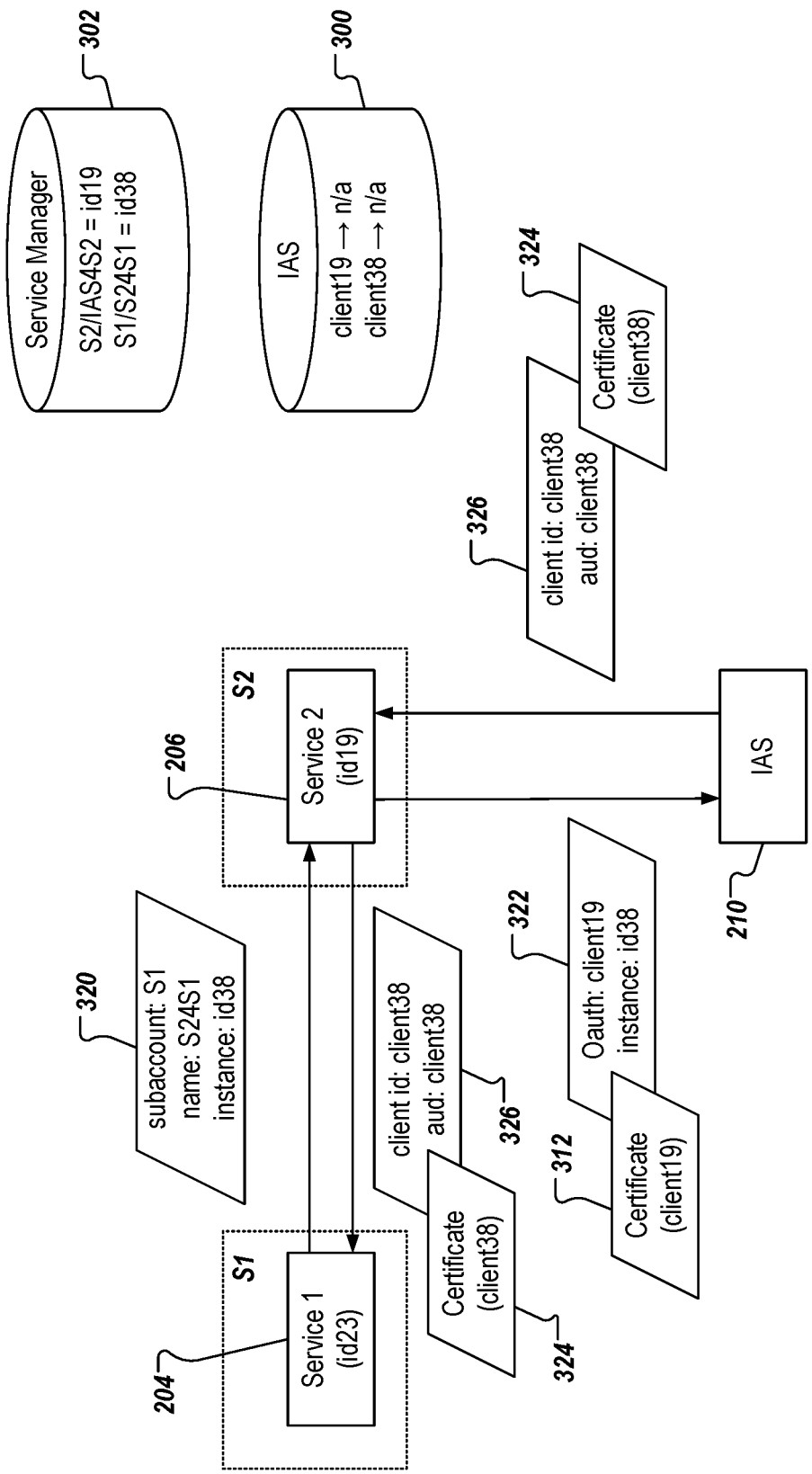

Referring now to FIG. 3B, a developer of the first service 204 creates a service instance of the second service 206 that is assigned an instance identifier of id38 (e.g., by SM 212), which uniquely identifies the service instance within the subaccount S1. The developer of the first service assigns the name S24S1 to the service instance of the second service. The service manager 212 stores this relation for later lookup of the identifier by name and context (e.g., S1/S24S1=id38). In some examples, the instance is created by sending a request 320 to the service 206, the request including sub-account, name, instance identifier (e.g., [S1, S24S1, id38]).

In response, to receiving the request 320, the service 206 sends a request 322 to the IAS 210 to create a clone of the client with identifier client19 (e.g., the authentication client 314 of FIG. 3A) for the service instance with the identifier id38. The service 206 authenticates the request 322 by presenting the client certificate 312 (with identifier client19).

In response to receiving the request 322, the IAS 210 associates identifier id38 to a client with identifier client38. The IAS 210 returns a client certificate 324 that includes the identifier client38 and an client 326 with identifier client38 to the service 206, which returns both to the service 204. The client 326 is a clone of the client 314, but has aud populated with identifier client38. Because the original client19 has no route stored from client19 to any other client, no other client identifier is added to aud.

With the setup established as depicted in FIG. 3B, the client 326 can be used to get a token from the IAS 210 that includes client38 in aud. With this token and the matching certificate with identifier client38 (i.e., the certificate 324), the second service 206 can be called and can verify that the call is valid, because the identifier from the certificate is in aud of the token.

Figure 3C:
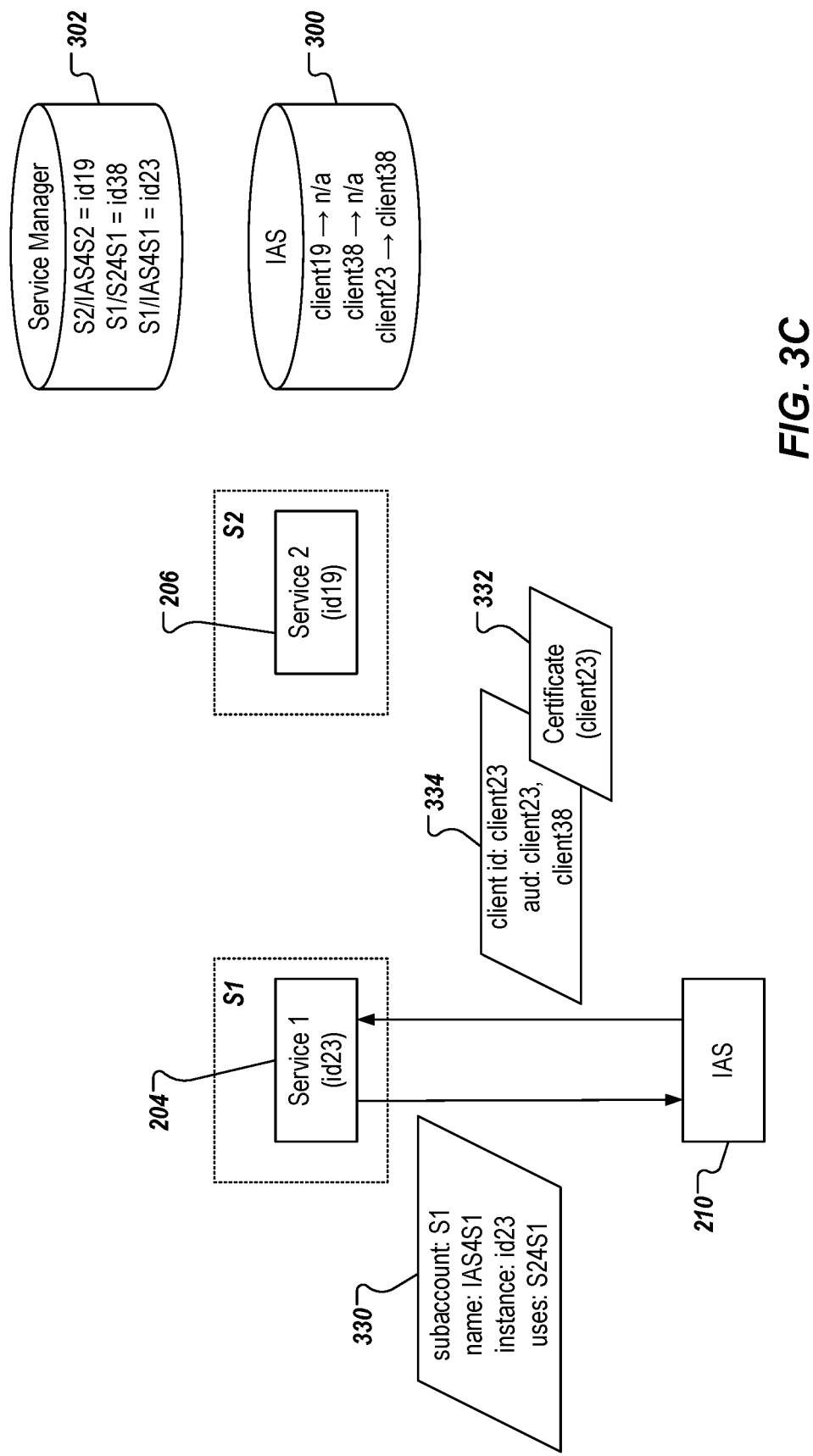

Referring now to FIG. 3C, a developer of the first service creates a service instance of IAS 210 with the name IAS4S1 in the context of subaccount S1, which is assigned the instance identifier id23 by the service manager 212. In a request 330 to the IAS 210, the developer declares the intent to use the instance with identifier S24S1 (e.g., [IAS4S1, S1, id23, S24S1]). The service manager 212 not only stores the relation from IAS4S1 in S1 to id23 for later lookup of the identifier by name and context, the service manager 212 also looks up the identifier for S24S1 in the same context S1 and identifies the used service with identifier id38.

In response to the request 330, the IAS 210 associates identifier id23 to a client with identifier client23 and also stores the route from client23 to client38 associated with id38. The IAS 210 returns a client certificate 332 and a client 334 to the first service 204. The client certificate 332 includes identifier client23 to the service instance id23 and the client 334 includes identifier client23 and aud populated with identifiers client23 and client38, because it has stored a route from client23 to client38. Consequently, the aud of client 334 expresses the allowed use of the second service by the first service.

With this setup established as depicted in FIG. 3C, the client 334 can be used to get a token from the IAS 210 that includes client38 and client23 in aud. With this token and the client certificate 332 (with identifier client23), the first service can be called and can verify that the call is valid, because the identifier from the certificate is in aud of the token. Further, the first service can then use the same token to call the second service with client certificate with identifier client38 (i.e., the client certificate 324) and the second service can verify that the call is valid, because the identifier from the client certificate is in aud of the token.

Figure 3D:
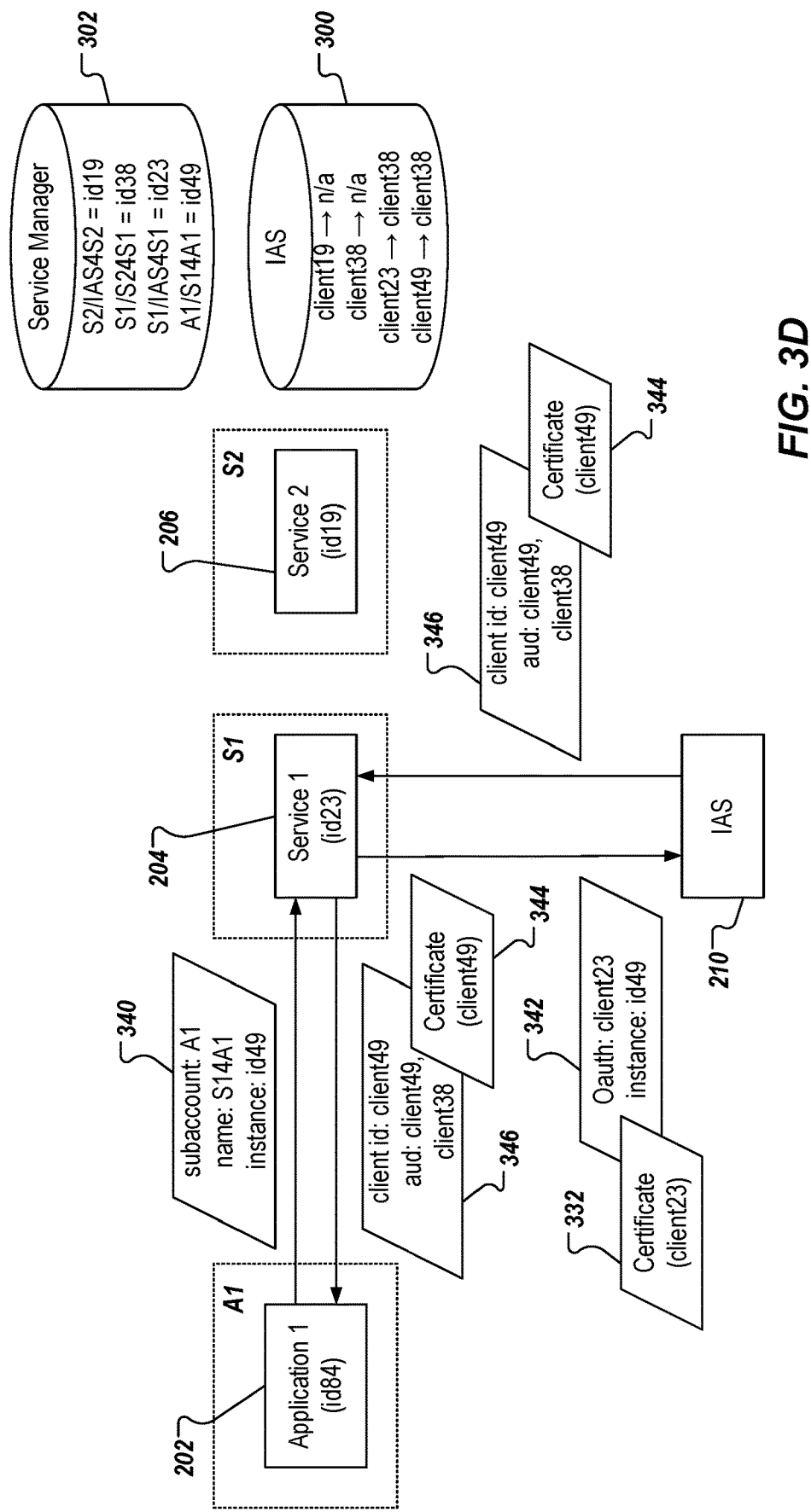

Referring now to FIG. 3D, a developer of the application 202 creates an instance of the first service 204 with name S14A1 in the context of subaccount A1, which is assigned the instance identifier id49 by the service manager 212. For example, a request 340 is sent to the service 204, the request 340 including the sub-account, name, and identifier (e.g., [A1, S14A1, id49]). The service manager 212 stores this relation for later lookup of the identifier by name and context (e.g., A1/S14A1=id49).

In response to the request 340, the service 204 sends a request 342 to the IAS 210 to create a clone of its own client with identifier client23 (i.e., the client 334) for the service instance with identifier id49. The service 204 authenticates the request by presenting the client certificate 332 (with identifier client23). In response, the IAS 210 associates identifier id49 to a client with identifier client49. The IAS 210 returns a client certificate 344 that includes the identifier client49 and a client 346 with identifier client49 to the service 204, which returns both to the application 202. The client 346 is a clone of the client 334, but has aud populated with identifiers client49 and client38, because the original client23 has a route stored from client23 to client38.

With this setup established as depicted in FIG. 3D, the client with identifier client49 (i.e., the client 346) can be used to get a token from the IAS 210 that includes client49 and client38 in aud. With this token and the client certificate with identifier client49 (i.e., the certificate 344), the service 204 can be called and can verify that the call is valid, because the identifier from the certificate 344 is in aud of the token. The service 204 can use the same token to call the service 206 with client certificate with identifier client38 (i.e., the certificate 324). The service 206 can verify that the call is valid, because the identifier from the client certificate is in aud of the access token.

Figure 3E:
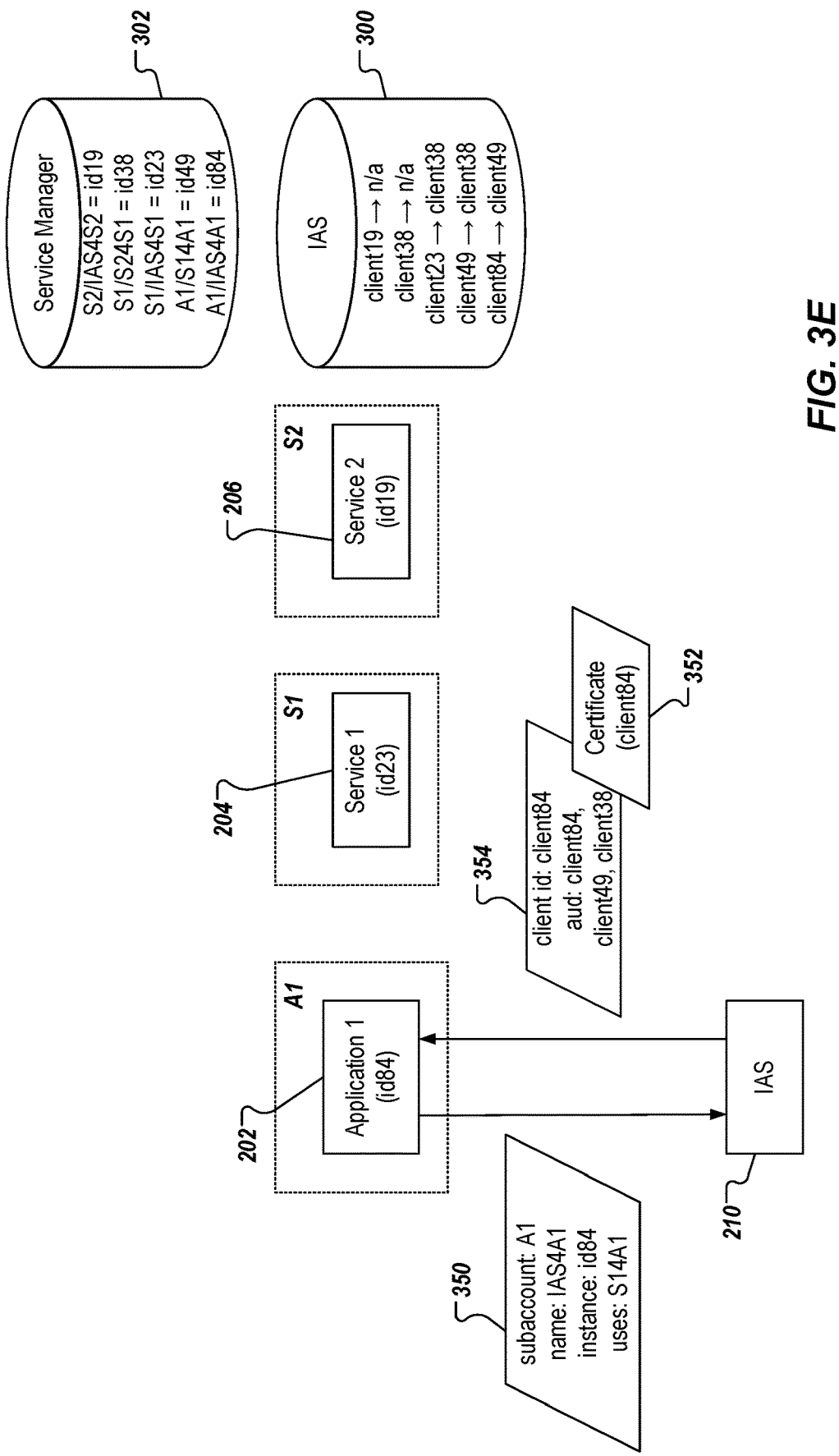

Referring now to FIG. 3E, the developer of the application 202 creates a service instance of IAS with name IAS4A1 in the context of subaccount A1 that gets assigned the instance identifier id84 by the service manager 212. For example, the developer of the application 202 sends a request 350 to the IAS 210. In the request 350, the developer declares the intent to use the service with identifier S14A1 (e.g., [A1, ISA4A1, id84, S14A1]). Further, the service manager 212 not only stores the relation from IAS4A1 in A1 to id84 for later lookup of the identifier by name and context, the service manager 212 also looks up the identifier for S14A1 in the same context A1 and identifies the used service with identifier id49.

In response to the request 350, the IAS 210 associates the identifier id84 to a client with identifier client84 and also stores the route from client84 to client49 associated with id49. The IAS 210 returns a client certificate 352 and a client 354. The client 354 includes aud populated with identifiers client84, client49 and client38, because the IAS 210 has stored a route from client84 to client 49 and a route from client49 to client38. This expresses the allowed use of the service 204 by the application 202 and use of the service 206 by the service 204.

With this setup established, the client 354 (client84) can be used to get a token from the IAS 210 that includes client84, client49 and client38 in aud. With this token and the client certificate with identifier client84 (i.e., the client certificate 352), the service 204 can be called and can verify that the call is valid, because the identifier from the client certificate is in aud of the token. The service 204 can use the same token to call the service 206 with the client certificate that the service 204 received when creating its service instance of the second service 206 with the identifier client38 (i.e., the client certificate 324). The service instance 206 can verify that the call is valid, because the identifier from the client certificate is in the aud of the access token.

Accordingly, after the progression of FIGS. 3A-3E, the application 202 can be deployed (e.g., put into production use), such that users can interact with the application 202. In some examples, interaction with the application 202 results in the application 202 calling the service instance 204, which calls the service instance 206, as described in further detail herein.

Referring again to FIG. 2, in production use, a user 215 accesses the application 202 using a client device 214. For example, the application 202 can be hosted on a cloud platform that the client device 214 is in communication with. The user 215 is redirected to the IAS 210 for authentication. For example, the IAS 210 can display an authentication interface, to which the user 215 submits credentials.

For example, the application 202 performs a redirect to the IAS 210, requesting that the IAS 210 logon the user. In response, the IAS 210 presents a UI for username and password, such that the user enters the credentials directly to the IAS 210. Example credentials can include a user identifier (user id) and password. In the example of FIG. 2, the user 215 inputs the user id 'Joe' and the password '12345.' In response to the authentication request, the IAS 210 authenticates the user 215 (e.g., determines whether the user id and the password match). If the user 215 is authenticated, the IAS 210 redirects back to the application 202, returning an authorization code (e.g., 0815).

In response to receiving the authentication code, the application 202 sends a request 220 to the IAS 210 to request an access token for the user 215. The request 220 includes the authentication code (e.g., [client84, 0815)). The request 220 is sent with the client 354 (with identifier client84) and the client certificate 352 (with identifier client84). The IAS 210 returns an identity token 222 (e.g., OIDC token) for the user 215 with the user identifier and client84, client49 and client38 in aud (e.g., aud: client84, client49, client38).

With the identity token 222 and the client certificate 352 (with identifier client84), the application 202 can call the service instance 204. The service instance 204 can verify that the call is valid, because the identifier from the client certificate (i.e., client84) is in aud of the identity token 222. The service instance 204 can use the identity token 222 to call the service 206 with the client certificate 324 (with client38) that the service 204 received when creating its instance of service 206. The service instance 206 can verify that the call from the service instance 204 is valid, because the identifier from the client certificate 324 is in and of the identity token 222.

Figure 4:
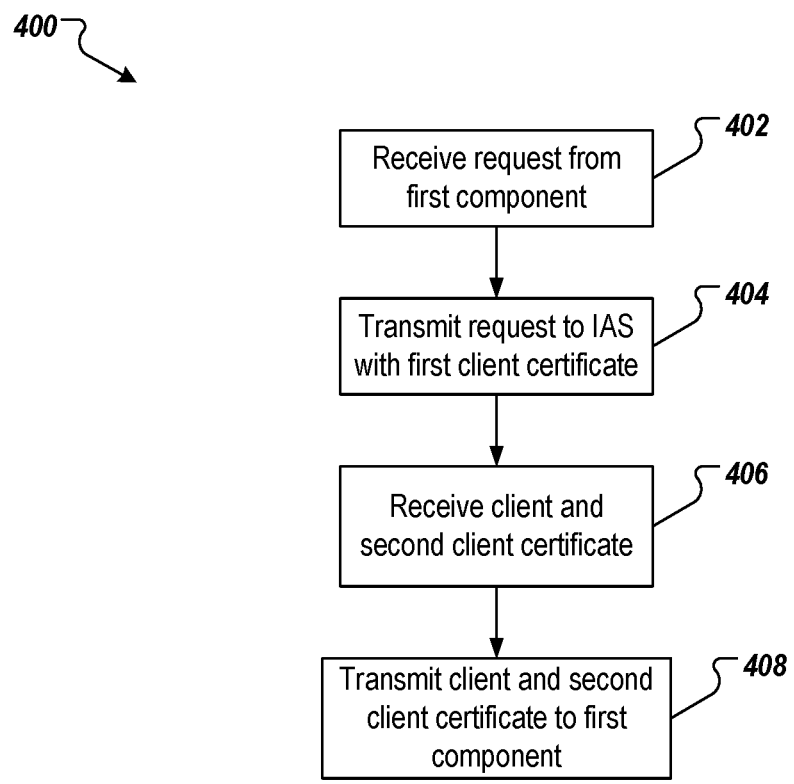
FIGS. 4 and 5 depict example processes that can be executed in accordance with implementations of the present disclosure.

FIG. 4 depicts an example process 400 that can be executed in accordance with implementations of the present disclosure. In some examples, the example process 400 is provided using one or more computer-executable programs executed by one or more computing devices. In some examples, the example process 400 is executed to define at least a portion of an allowed communication path between components (e.g., client, application, service) in a cloud platform.

A request is received from a first component (402). For example, a second component receives the request from the first component, and the request includes a request to establish a communication path between the first component and the second component. In some examples, the request includes values for each of sub-account, name, instance identifier. For example, and as described above with reference to FIG. 3B, the developer of the first service creates the service instance to call the service 206 of the second service using name S24S1 in the context of sub-account S1. To provide the route for this call (i.e., the communication path between the service 204 (first component) and the service 206 (second component)), the developer of the first service creates an instance of IAS, which is assigned the identifier id38 (e.g., by the service manager 212). The service manager 212 stores this relation for later lookup of the identifier by name and context (e.g., S1/S24S1=id38). In some examples, the instance is created by sending the request 320 to the service 206, the request including sub-account, name, instance identifier (e.g., [S1, S24S1, id38]).

A request is transmitted to an IAS (404). For example, in response to receiving the request from the first component, the second component transmits a request to the IAS for a clone of the client of the second component. In some examples, the request includes a client identifier of the second component and an instance identifier associated with the request from the first component. The request is transmitted with a client certificate of the second component. For example, and as described above with reference to FIG. 3B, in response to receiving the request 320, the service 206 sends the request 322 to the IAS 210 to create a clone of the client 314. The request 322 is authenticated to the IAS 210 by the client certificate 312 (with identifier client19).

A client and a second client certificate are received (406). For example, the second component receives the client and the second client certificate from the IAS. In some examples, the client includes a manifest defining a path including the first component. In some examples, the second client certificate includes a client identifier associated with an instance requested by the first component. For example, and with reference to FIG. 3B, in response to receiving the request 322, the IAS 210 associates identifier id38 to a client with identifier client38. The IAS 210 returns a client certificate 324 that includes the identifier client38 and a client 326 with identifier client38 to the service 206, which returns both to the service 204. The client 326 is a clone of the client 314, but has aud populated with identifier client38. Because the original client19 has no route stored from client19 to any other client, no other client identifier is added to aud.

The client and the second client certificate are transmitted to the first component (408). For example, the second component transmits the client and the second client certificate to the first component. With continued reference to FIG. 3B, the client 326 can be used to get an token from the IAS 210 that includes client38 in aud. With this token and the matching certificate with identifier client38 (i.e., the certificate 324), the service instance of the second service 206 can be called by the service 204 and can verify that the call is valid, because the identifier from the certificate is in aud of the token.

Figure 5:
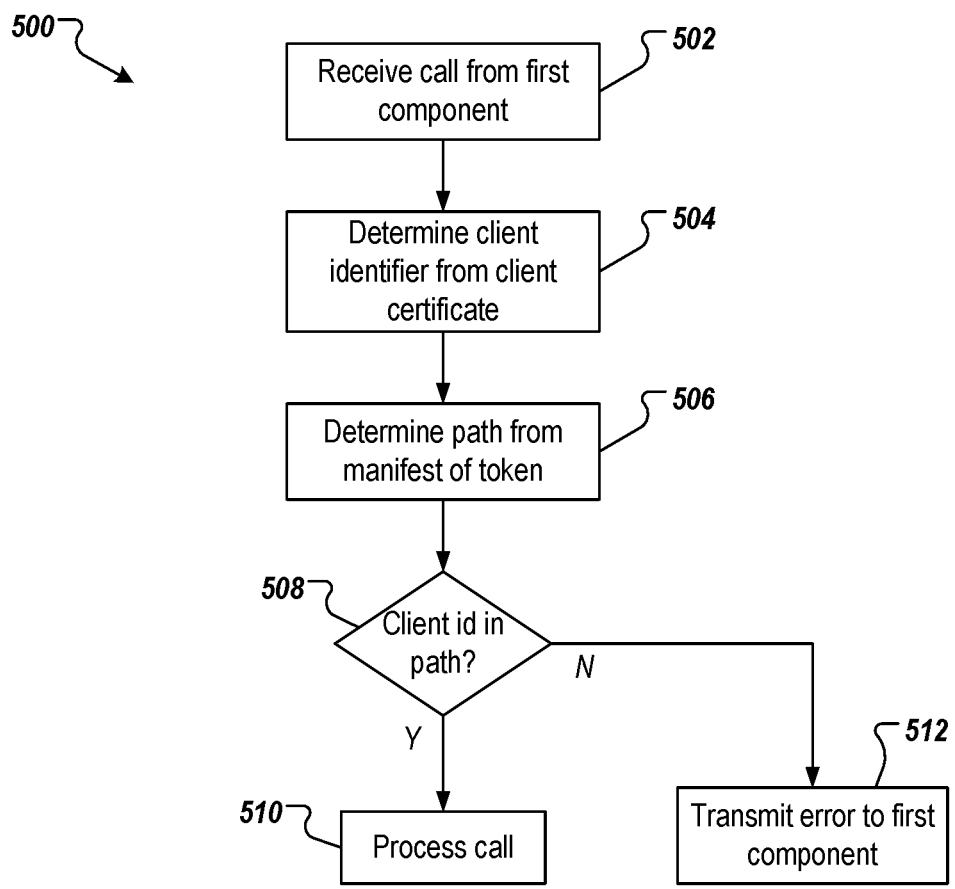

FIG. 5 depicts an example process 500 that can be executed in accordance with implementations of the present disclosure. In some examples, the example process 500 is provided using one or more computer-executable programs executed by one or more computing devices. The example process 500 can be executed by a component in a path of components during production use of an application that leverages a service-based architecture in a cloud platform.

A call is received from a first component (502). For example, a second component receives the call from the first component. In some examples, the call includes a call for the second component to perform some functionality and provide a response back to the first component. For example, and with reference to FIG. 2, the application 202 (first component) can call the service 204 (second component), the call includes the token 222 and the client certificate 354.

A client identifier is determined from the client certificate (504). For example, the second component reads the client identifier from the client certificate. A path is determined from a manifest of the token (506). For example, the second component reads the manifest (e.g., from aud) of the token. It is determined whether the client identifier is included in the path (508). If the client identifier is included in the path, the call is processed (510). For example, the second component performs functionality and provided some result. With reference to FIG. 2, the service instance 204 can use the token 222 to call the service 206 with the client certificate 324 (with client38) that the service 204 received. The service 206 can verify that the call from the service 204 is valid, because the identifier from the client certificate 328 is in aud of the token 222. If the client identifier is not included in the path, an error is transmitted to the first component (512).

Figure 6:
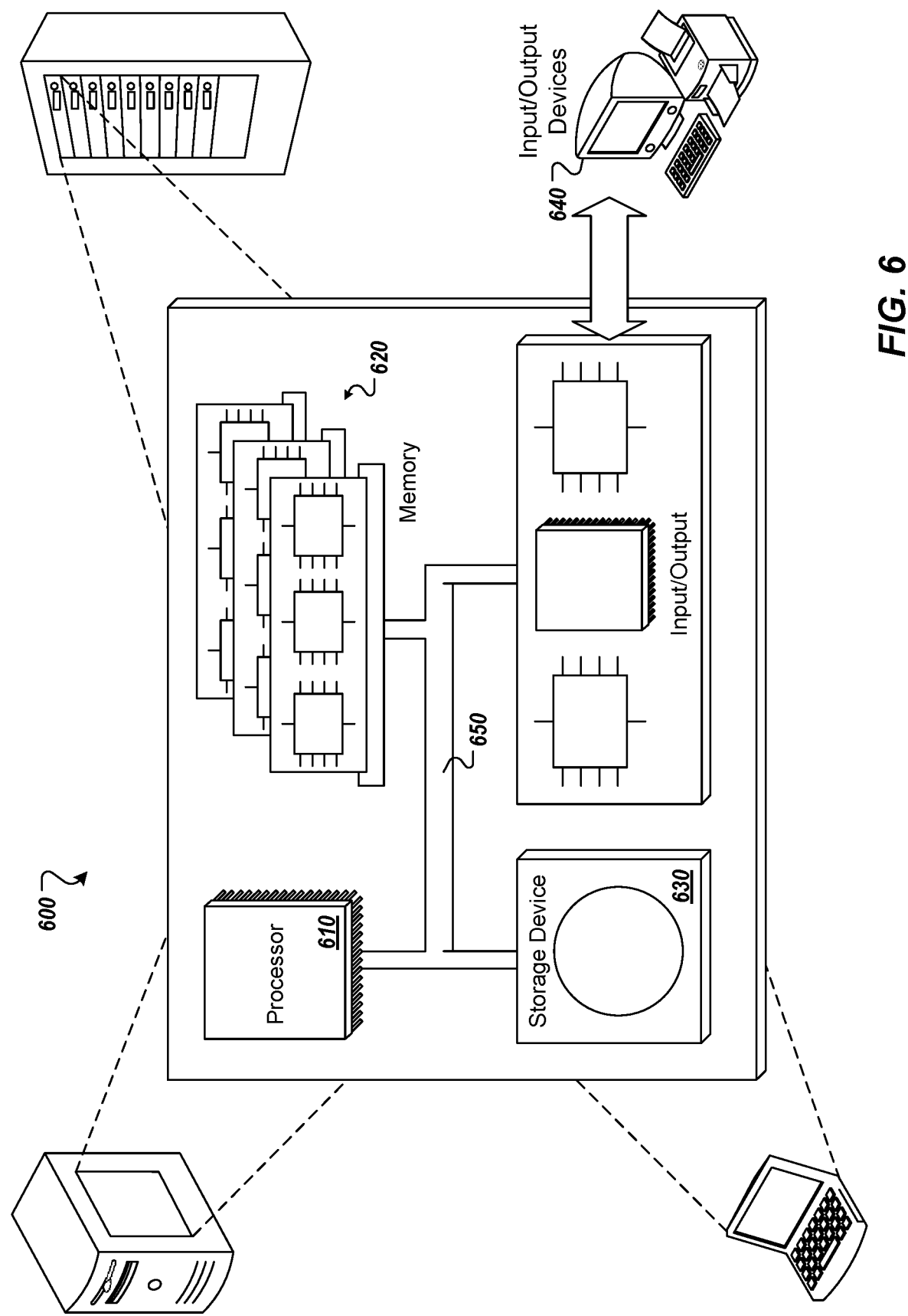
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. The components 610, 620, 630, 640 are interconnected using a system bus 650. The processor 610 is capable of processing instructions for execution within the system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the system 600. In some implementations, the memory 620 is a computer-readable medium. In some implementations, the memory 620 is a volatile memory unit. In some implementations, the memory 620 is a non-volatile memory unit. The storage device 630 is capable of providing mass storage for the system 600. In some implementations, the storage device 630 is a computer-readable medium. In some implementations, the storage device 630 may be a floppy disk device, a hard disk device, an optical disk device, or a tape device. The input/output device 640 provides input/output operations for the system 600. In some implementations, the input/output device 640 includes a keyboard and/or pointing device. In some implementations, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semi-conductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for secure access token forwarding between components in cloud platforms, the method being executed by one or more processors and comprising:
   receiving, from a first component and by a second component in a cloud platform, a first call, a token, and a first client certificate; wherein the token provided to the first component in response to a request from the first component to a central identity and authentication service (IAS) of the cloud platform, and the first client certificate is provided during execution of a process to generate the token;
   determining, by the second component, a first client identifier associated with the first component;
   determining, by the second component, that the first client identifier is included in a manifest of the token, the manifest defining at least a portion of a communication path between components within the cloud platform, and in response:
   executing functionality responsive to the first call;
   receiving, from a third component and by the second component, a second call, the token, and a second client certificate;
   determining, by the second component, a second client identifier associated with the third component; and
   determining, by the second component, that the second client identifier is absent from the manifest of the token, and in response:
   transmitting an error to the third component.

2. The method of claim 1, wherein executing functionality responsive to the first call at least partially comprises transmitting, from the second component and to a third component, a second call with the token.

3. The method of claim 1, wherein the token is received by the first component from a third component.

4. The method of claim 1, wherein the token comprises an open authentication (OAuth) client comprising an audience field populated with the manifest, and the first client certificate comprises a X.509 client certificate.

5. A non-transitory computer-readable storage medium coupled to one or more processors and having instructions stored thereon which, when executed by the one or more processors, cause the one or more processors to perform operations for secure access token forwarding between components in cloud platforms, the operations comprising:
   receiving, from a first component and by a second component in a cloud platform, a first call, a token, and a first client certificate; wherein the token provided to the first component in response to a request from the first component to a central identity and authentication service (IAS) of the cloud platform, and the first client certificate is provided during execution of a process to generate the token;
   determining, by the second component, a first client identifier associated with the first component;
   determining, by the second component, that the first client identifier is included in a manifest of the token, the manifest defining at least a portion of a communication path between components within the cloud platform, and in response:
   executing functionality responsive to the first call;
   receiving, from a third component and by the second component, a second call, the token, and a second client certificate;
   determining, by the second component, a second client identifier associated with the third component; and
   determining, by the second component, that the second client identifier is absent from the manifest of the token, and in response:
   transmitting an error to the third component.

6. The computer-readable storage medium of claim 5, wherein executing functionality responsive to the first call at least partially comprises transmitting, from the second component and to a third component, a second call with the token.

7. The computer-readable storage medium of claim 5, wherein the token is received by the first component from a third component.

8. The computer-readable storage medium of claim 5, wherein the token comprises an open authentication (OAuth) client comprising an audience field populated with the manifest, and the first client certificate comprises a X.509 client certificate.

9. A system, comprising:
a computing device; and
a computer-readable storage device coupled to the computing device and having instructions stored thereon which, when executed by the computing device, cause the computing device to perform operations for natural language explanations for secure access token forwarding between components in cloud platforms, the operations comprising:
receiving, from a first component and by a second component in a cloud platform, a first call, a token, and a first client certificate; wherein the token provided to the first component in response to a request from the first component to a central identity and authentication service (IAS) of the cloud platform, and the first client certificate is provided during execution of a process to generate the token;
determining, by the second component, a first client identifier associated with the first component;
determining, by the second component, that the first client identifier is included in a manifest of the token, the manifest defining at least a portion of a communication path between components within the cloud platform, and in response:
executing functionality responsive to the first call;
receiving, from a third component and by the second component, a second call, the token, and a second client certificate;
determining, by the second component, a second client identifier associated with the third component; and
determining, by the second component, that the second client identifier is absent from the manifest of the token, and in response:
transmitting an error to the third component.

10. The system of claim 9, wherein executing functionality responsive to the first call at least partially comprises transmitting, from the second component and to a third component, a second call with the token.

11. The system of claim 9, wherein the token is received by the first component from a third component.

* * * * *